US008628122B2

(12) United States Patent
Kozal (10) Patent No.: US 8,628,122 B2
(45) Date of Patent: Jan. 14, 2014

(54) PIPE COMPRESSION JOINT (75) Inventor: Michael D. Kozal, Caledonia, MI (US)

(73) Assignee: Pridgeon & Clay, Inc., Grand Rapids, MI (US)

( * ) Notice: Subject to any disclaimer, the term of this patent is extended or adjusted under 35 U.S.C. 154(b) by 214 days.

(21) Appl. No.: 12/602,557

(22) PCT Filed: May 29, 2008

(86) PCT No.: PCT/US2008/065097
§ 371 (c)(1),
(2), (4) Date: Dec. 1, 2009

(87) PCT Pub. No.: WO2008/154167
PCT Pub. Date: Dec. 18, 2008

(65) Prior Publication Data
US 2010/0181767 A1  Jul. 22, 2010

Related U.S. Application Data (60) Provisional application No. 60/942,322, filed on Jun. 6, 2007.

(51) Int. Cl.
F16L 23/16 (2006.01)

(52) U.S. Cl.
USPC .......................................... 285/412

(58) Field of Classification Search
USPC ................ 285/334.5, 412, 414, 416, 413
See application file for complete search history.

(56) References Cited

U.S. PATENT DOCUMENTS

| 758,102 | A | * | 4/1904 | Powers ...................... 285/334.5 |
| 1,821,863 | A | | 9/1931 | Wilson |
| 1,821,865 | A | | 9/1931 | Wilson |
| 3,572,778 | A | | 3/1971 | Cassel |
| 3,604,238 | A | * | 9/1971 | Asari ............................ 72/206 |
| 3,749,426 | A | | 7/1973 | Tillman, III |
| 3,865,413 | A | | 2/1975 | Mizusawa et al. |
| 4,516,782 | A | * | 5/1985 | Usher ........................... 264/258 |
| 4,519,639 | A | * | 5/1985 | Florian ......................... 285/415 |
| 4,544,188 | A | | 10/1985 | Dugger |
| 4,662,660 | A | | 5/1987 | Perea |
| 6,269,524 | B1 | | 8/2001 | Cassel |
| 6,519,815 | B2 | | 2/2003 | Cassel et al. |
| 6,758,501 | B2 | | 7/2004 | Amedure et al. |
| 7,025,393 | B2 | | 4/2006 | Amedure et al. |
| 7,055,223 | B2 | | 6/2006 | Cassel et al. |
| 7,231,694 | B2 | | 6/2007 | Ignaczak et al. |
| 7,252,310 | B2 | | 8/2007 | Amedure et al. |
| 2003/0015872 | A1 | | 1/2003 | Potts et al. |
| 2004/0046391 | A1 | | 3/2004 | Vasudeva |
| 2006/0175837 | A1 | | 8/2006 | Ignaczak et al. |

(Continued)

Primary Examiner — Daniel P. Stodola
Assistant Examiner — James Linford
(74) Attorney, Agent, or Firm — McGarry Bair PC (57) ABSTRACT A pipe compression joint assembly (10) comprises a male pipe end (20) having an outwardly-extending annular rib (34), a female pipe end (40) adapted for slidable insertion of the male pipe end (20) therein, a first clamp ring (54) adapted for slidable coupling with the male pipe end (20) and bearing against the annular rib (34), and a second clamp ring (52) fixedly attached to the female pipe end (40). The first clamp ring (54) can be controllably urged toward the second clamp ring (52) after the male pipe end (20) has been inserted into the female pipe end (40) so that the female pipe end (40) deformably engages the annular rib (34) to effect a sealed joint without the use of a gasket.

24 Claims, 8 Drawing Sheets

(56) References Cited

U.S. PATENT DOCUMENTS

2006/0192385 A1  8/2006  Hiernard et al.
2006/0202480 A1  9/2006  Cassel et al.
2007/0052239 A1  3/2007  Dole

* cited by examiner

PIPE COMPRESSION JOINT

CROSS-REFERENCE TO RELATED APPLICATION

This application is the national phase application from International Application No. PCT/US2008/065097, filed May 29, 2008, which claims the benefit of U.S. Provisional Patent Application No. 60/942,322, filed Jun. 6, 2007, both of which are incorporated herein in their entireties.

BACKGROUND OF THE INVENTION

1. Field of the Invention

The invention relates to a compression joint for use in joining conduit segments.

2. Description of the Related Art

Vehicular exhaust systems typically comprise several different metallic components which must be interconnected. For example, the exhaust system can comprise a muffler which is connected to an exhaust manifold upstream of the muffler, and a tailpipe which is connected downstream of the muffler. The connections must be readily separable so that components of the exhaust system that must be repaired or replaced can be easily removed. At the same time, the connection joints must be tight to prevent the escape of exhaust gases through the joints upstream of the discharge end of the tailpipe. Conventional connections typically comprise a butt joint.

Conventional connections frequently utilize a gasket to enhance the seal between the butt-joined metallic components. Changes in temperature of the components can contribute to thermal contraction and expansion, which can compromise a seal without a gasket. However, the temperature of the exhaust gases, which can approach 1800° F., and the corrosive properties of the gases, can cause deterioration of the gasket and the adjacent metallic components, and can result in the fusing of the gasket and components. This can lead to difficulty in separating the components so that the joint can only be separated by cutting the adjoining components apart. This adds to the labor involved in working with the components, and can result in the replacement of components that might otherwise remain serviceable.

There is a need for a joint which it can provide a satisfactory seal without the use of a gasket, which can be readily assembled and disassembled, and which is not subject to excessive corrosion.

SUMMARY OF THE INVENTION

According to one aspect of the invention, an assembly (10) for forming a pipe compression joint comprises a male pipe end (20) having an outwardly-extending annular rib (34), comprising an inward transition portion, wherein the inward transition portion has a radius of curvature capable of deformation, a female pipe end (40) adapted for slidably receiving the male pipe end (20) therein and having a constant diameter portion that terminates at a flared portion capable of deformation, a first clamp ring (54) on the male pipe end (20) for bearing against the annular rib (34), and a second clamp ring (52) fixedly attached to the female pipe end (40) a distance from the flared portion such that the second clamp ring (52) is spaced from the flared portion by at least part of the constant diameter portion. The first clamp ring (54) can be controllably urged toward the second clamp ring (52) after the male pipe end (20) has been received into the female pipe end (40) so that the flared portion of the female pipe bears against the inward transition portion, and one or both of the inward transition portion and the flared portion is deformed to effect a sealed joint without use of a gasket.

According to another aspect of the invention, a pipe compression joint comprises a male pipe end (20) having an outwardly-extending annular rib (34) comprising an inward transition portion, wherein the inward transition portion has a radius of curvature capable of deformation, a female pipe end (40) with the male pipe end (20) slidably received therein and having a constant diameter portion that terminates at a flared portion capable of deformation, a first clamp ring (54) on the male pipe end (20) and bearing against the annular rib (34), a second clamp ring (52) fixedly attached to the female pipe end (40) a distance from the flared portion such that the second clamp ring (52) is spaced from the flared portion by at least part of the constant diameter portion, and at least two adjustable fasteners (56) connecting the first clamp ring (54) to the second clamp ring (52). The fasteners (56) are tightened so that the first clamp ring (54) and the second clamp ring (52) compress the flared portion of the female pipe end against the inward transition portion, wherein one or both of the inward transition portion and the flared portion is deformed to effect a sealed joint without use of a gasket.

DESCRIPTION OF AN EMBODIMENT OF THE INVENTION

Referring now to the drawings, and in particular to FIGS. 1-5, a first embodiment of the invention comprising a compression joint assembly 10 is illustrated. The compression joint assembly 10 comprises a male pipe coupling or male pipe end 12, a female pipe coupling or male pipe end 14, and a clamp assembly 16. The compression joint assembly 10 can comprise a portion of a larger assembly, such as a vehicle exhaust system comprising an exhaust manifold, a muffler, a tailpipe, and other components, which are not illustrated and form no necessary part of the invention. For convenience, only the compression joint assembly 10 is illustrated in the drawings. In the example shown in FIG. 1, the male pipe end 12 would be associated with an upstream component, such as a muffler, and the female pipe end 14 would be associated with a downstream component, such as a tailpipe.

The male pipe end 12 comprises a male pipe end 20 comprising a generally annular, pipe-like member having a circular wall 22 defining a circular channelway 24 fluidly coupled with an upstream component (not shown).

The circular wall 22 has a generally constant upstream diameter 36. The circular wall 22 at the downstream terminus of the male pipe end 20 comprises an expanding outward transition portion 26 transitioning to a chine portion 28, in turn transitioning to an inward transition portion 30, and terminating in a straight portion 32 defining an opening 33 to the channelway 24 and having a generally constant downstream diameter 38. The chine portion 28 and the transition portions 26, 30 define an annular rib 34 extending radially outwardly of the pipe wall 22. The outward transition portion 26, chine portion 28, and inward transition portion 30 are configured, in part, so that the upstream diameter 36 upstream of the outward transition portion 26 is greater than the downstream diameter 38 downstream of the inward transition portion 30.

Preferably, the outward transition portion 26 has a constant radius of curvature from the pipe wall 22 to the chine portion 28. The chine portion 28 preferably has a constant radius of curvature between the outward transition portion 26 and the inward transition portion 30. Preferably, the inward transition portion 30 has a radius of curvature which decreases from the chine portion 28 to the straight portion 32.

The female pipe end 14 comprises a female pipe end 40 having a generally constant diameter 46 somewhat greater than the downstream diameter 38. The female pipe end 40 comprises a pipe wall 42 defining a channelway 44 therethrough. The pipe wall 42 transitions at an upstream terminus to define an opening 48. In a preferred embodiment, the pipe wall 42 terminates in a somewhat flared portion 50 defining the opening 48. The opening 48 is adapted for slidable receipt of the straight portion 32 of the male pipe end 20 for fluid communication of the channelways 24, 44.

The clamp assembly 16 comprises a male or first clamp ring 54, a female or second clamp ring 52, and a plurality of adjustable fasteners 56, preferably threaded. The second clamp ring 52 is a circular ring-like body defining a second clamp ring opening 58 therethrough having a diameter for slidable receipt of the second clamp ring 52 over the pipe wall 42. A plurality of regularly-spaced ears 66 extend radially-outwardly from the circumference of the second clamp ring 52, each having an aperture 70 therethrough for slidable receipt of a fastener 56. The first clamp ring 54 is a generally circular ring-like body defining a first clamp ring opening 60 therethrough adapted for slidable receipt of the first clamp ring 54 over the pipe wall 22. A plurality of regularly-spaced ears 64 extend radially-outwardly from the circumference of the first clamp ring 54, each having a threaded aperture 68 therethrough for threaded receipt of a fastener 56. The number and spacing of the ears 64, 66 can be selected based upon the clamping force desired. As illustrated herein, there are five equally-spaced ears 64, 66 on each clamp ring 52, 54 and five corresponding fasteners 56.

The clamp rings 52, 54 are adapted for coupling as hereinafter described. The second clamp ring 52 is fixedly attached to the female pipe end 40 proximate the opening 48 in a suitable manner, such as by welding, brazing, soldering, and the like, so that a longitudinal force applied to the second clamp ring 52 through the fasteners 56 and ears 66 will be transferred to the female pipe end 40. Preferably, the distance between the tangent point defining the point of contact of the second clamp ring 52 with the pipe wall 42 and the opening 48 of the female pipe end 40 is 7-10 mm, identified in FIG. 2 as the distance "D." This separation enables the flaring deformation of the terminus of the female pipe end 40 as it is urged against the annular rib 34.

The first clamp ring 54 is provided with a radially-curved inner shoulder 62 having a radius of curvature which is complementary to the radius of curvature of the outward transition portion 26. Slidable engagement of the inner shoulder 62 of the first clamp ring 54 with the outward transition portion 26 of the annular rib 34 will enable a longitudinal force applied to the first clamp ring 54 to be transferred to the male pipe end 20, while enabling the first clamp ring 54 to be rotated about the circular wall 22.

The compression joint is assembled by inserting the straight portion 32 of the male pipe end 20 into the opening 48 of the female pipe end 40. The first clamp ring 54 is rotated to align the threaded apertures 68 with the apertures 70 of the second clamp ring 52 so that the fasteners 56 can be slidably inserted through the apertures 70 and threaded into the threaded apertures 68. Threading of the fasteners 56 into the threaded apertures 68 will controllably urge the second clamp ring 52 and the first clamp ring 54 together. Since the second clamp ring 52 is fixedly attached to the female pipe end 40, and the first clamp ring 54 is held in place by the annular rib 34, tightening of the fasteners 56 will drive the flared portion 50 of the female pipe end 40 against the inward transition portion 30 of the male pipe end 20, thereby coupling the male pipe end 12 to the female pipe end 14 in a gasket-less compression joint. Preferably, the length of the surface-to-surface contact between the flared portion 50 and the inward transition portion 30 is 3 to 5 mm. The number of fasteners 56 required depends on the diameter of the clamp rings 52, 54: the smaller the diameter, the fewer the fasteners to a minimum of two. Larger diameters will require more fasteners.

Some deformation of the flared portion 50 and the inward transition portion 30 of the annular rib 34 along the surface-to-surface contact can occur, depending on the force drawing the male pipe end 20 and the female pipe end 40 together. The flaring of the female pipe end 40 will facilitate the continuity of the surface-to-surface contact of the flared portion 50 with the inward transition portion 30, and will minimize the "chisel" effect of driving an unflared pipe wall into engagement with the inward transition portion 30.

The male pipe end 20 and the female pipe end 40 must be scarfed (i.e. cleaned) along the surface-to-surface contact. Preferably, the fasteners can comprise 8 mm or 10 mm bolts having sufficient strength and durability for the purposes contemplated herein. The 10 mm bolts will typically tightened to a nominal torque of 40 Nm per fastener. The 8 mm bolts must be tightened to a nominal torque of 25 Nm per fastener.

Preferably, the pipe ends 20, 40 are 300-400 series stainless steel having a pipe wall thickness of 1.2-2.0 mm. The clamp rings 52, 54 are preferably the same material as the pipe ends 20, 40, having a nominal material thickness of 3.8 mm. The clamp rings 52, 54 can comprise a different material, but if so will have a lower coefficient of thermal expansion than the pipe ends 20, 40 in order to maintain the selected clamp load under the greater thermal expansion of the pipe ends 20, 40.

Grain direction in the pipe ends 20, 40 is important. Grain direction must be longitudinal, i.e. parallel to the longitudinal axis of the pipe ends 20, 40. This enables thermal expansion to occur primarily in a longitudinal direction, thereby maintaining the seal. If the grain direction is other than longitudinal, repeated thermal expansion and contraction can cause the seal to fail. A longitudinal grain direction can be established during manufacture of the components. In particular, rolled pipe has a longitudinal grain direction.

The annular rib 34 can be formed by a sizing press, spun, rolled into the tube, or swaged.

The pipe compression joint assembly 10 described herein can withstand a temperature of up to 1800° F. and pressures of up to 15 psi. The absence of a gasket simplifies the construction and assembly of the connection, and results in a less costly assembly. The connection can be readily disassembled, and is resistant to corrosion and deterioration caused by the exhaust gases and other environmental conditions.

Figure 1:
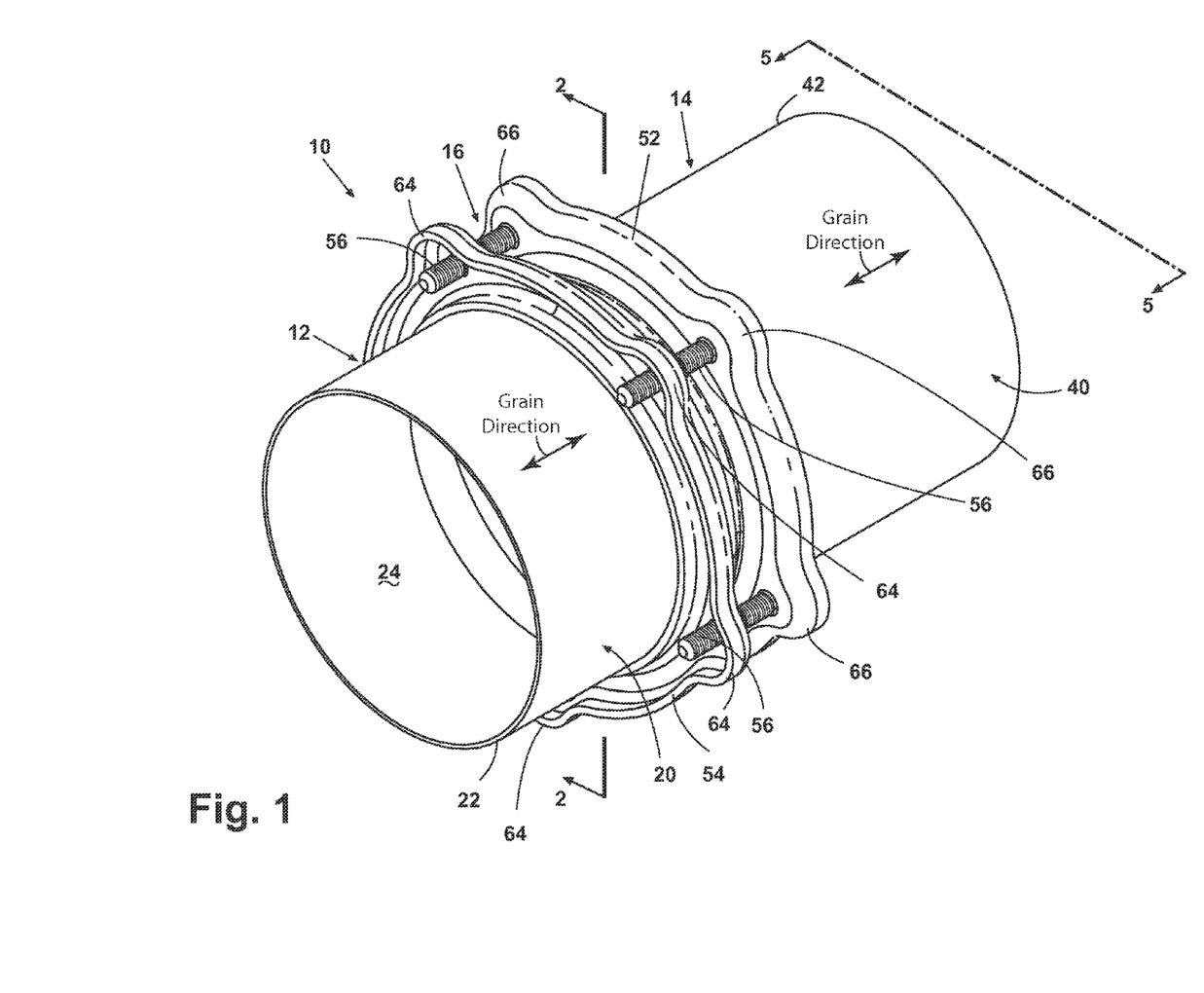
FIG. 1 is a perspective view of a first embodiment according to the invention of a pipe compression joint.
Figure 2:
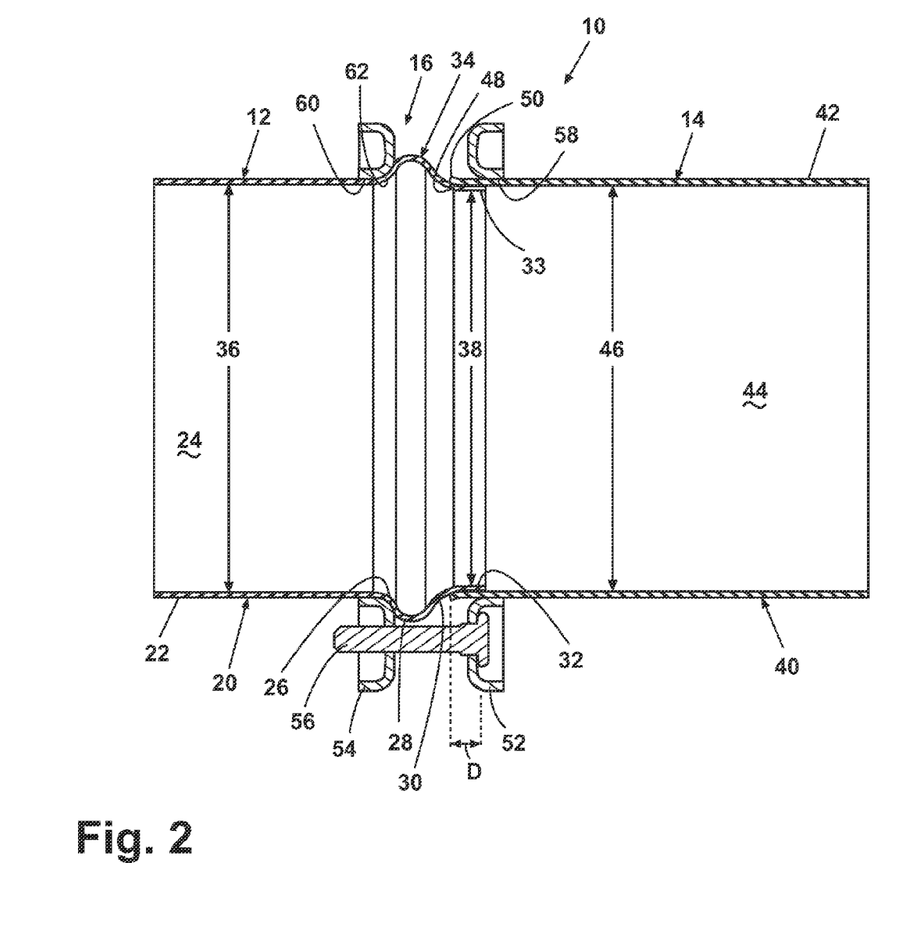
FIG. 2 is a sectional view of the pipe compression joint of FIG. 1 taken along view line 2-2.
Figure 3:
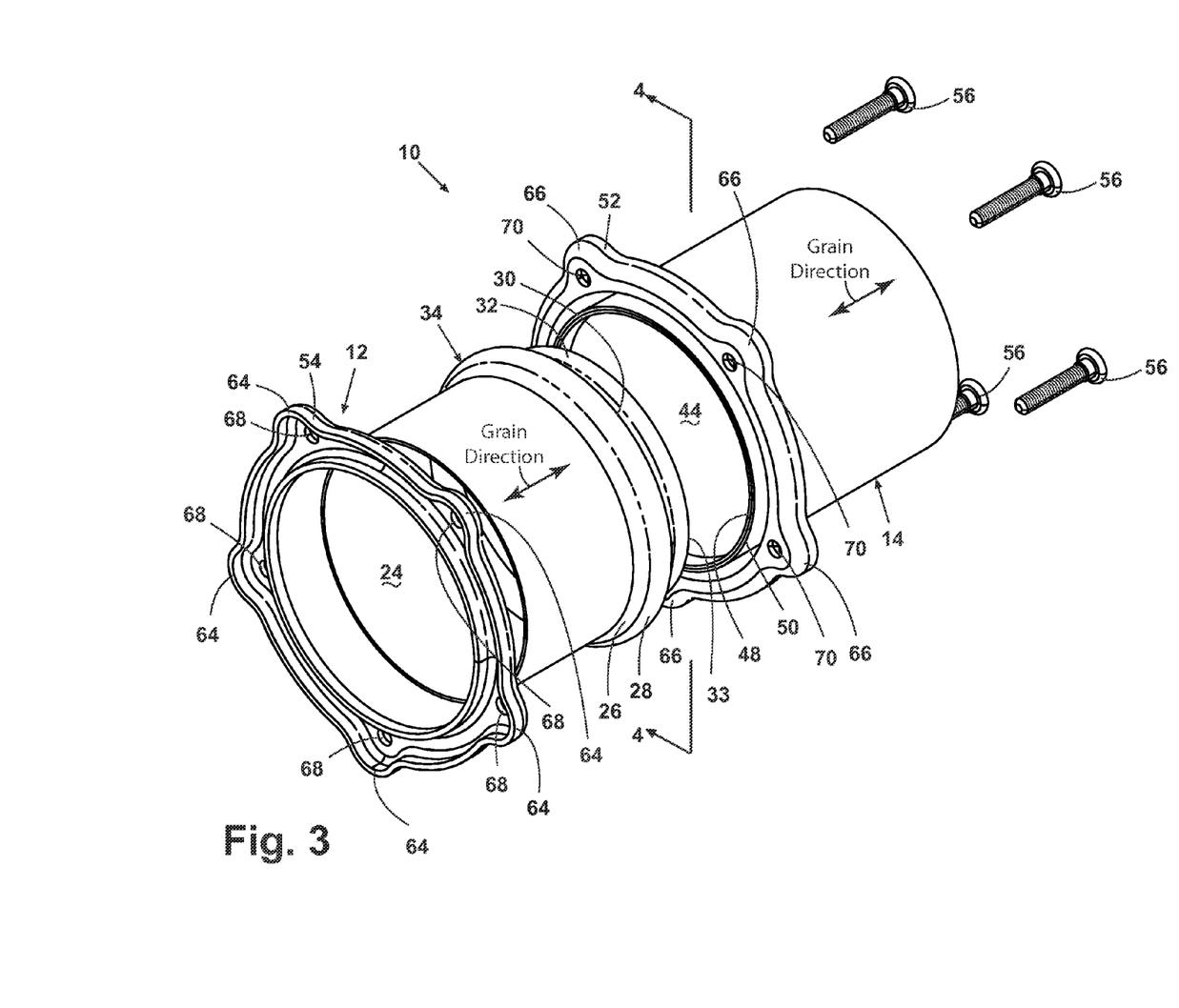
FIG. 3 is an exploded view of the pipe compression joint of FIG. 1.
Figure 4:
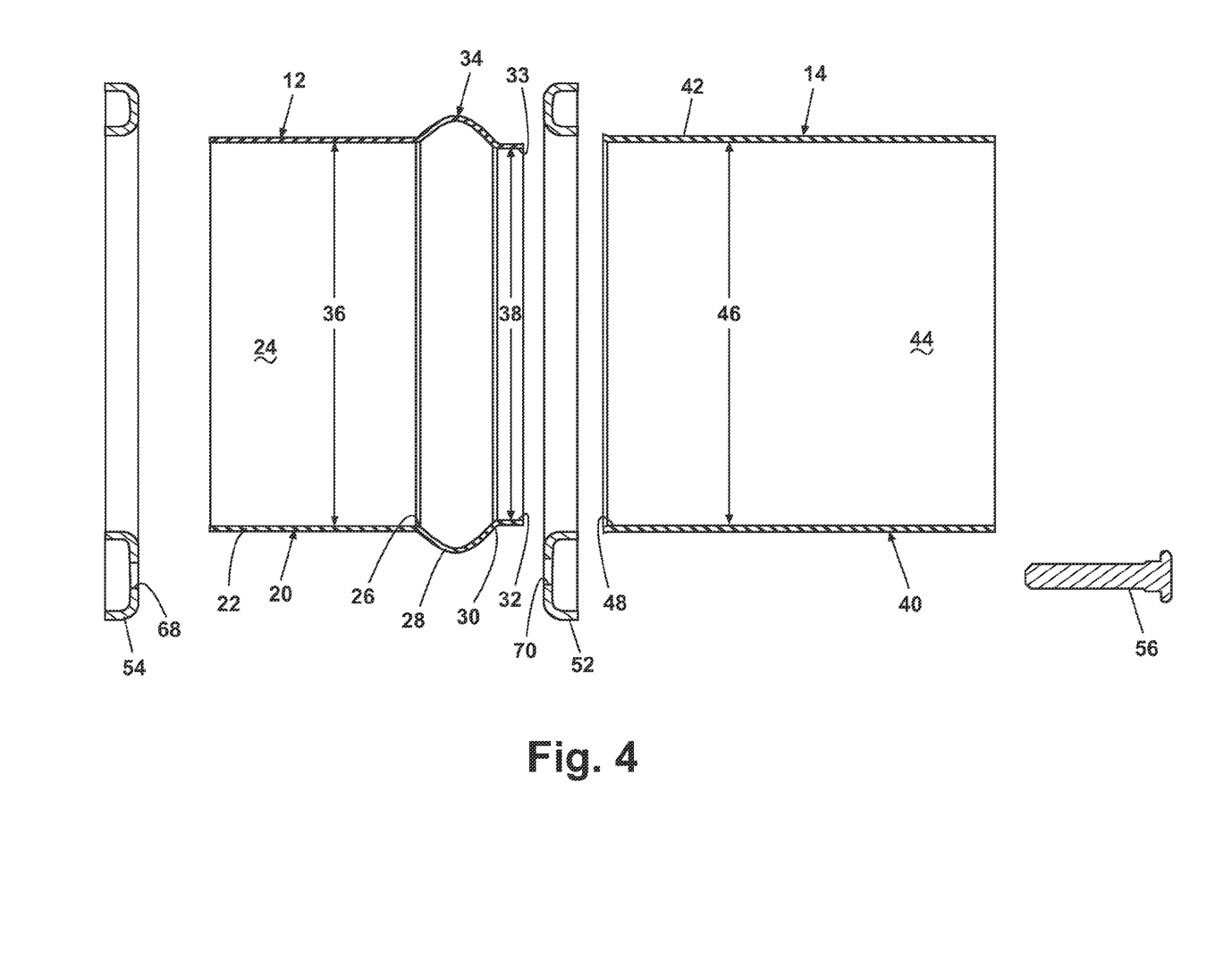
FIG. 4 is an exploded sectional view of the pipe compression joint of FIG. 3 taken along view line 4-4.
Figure 5:
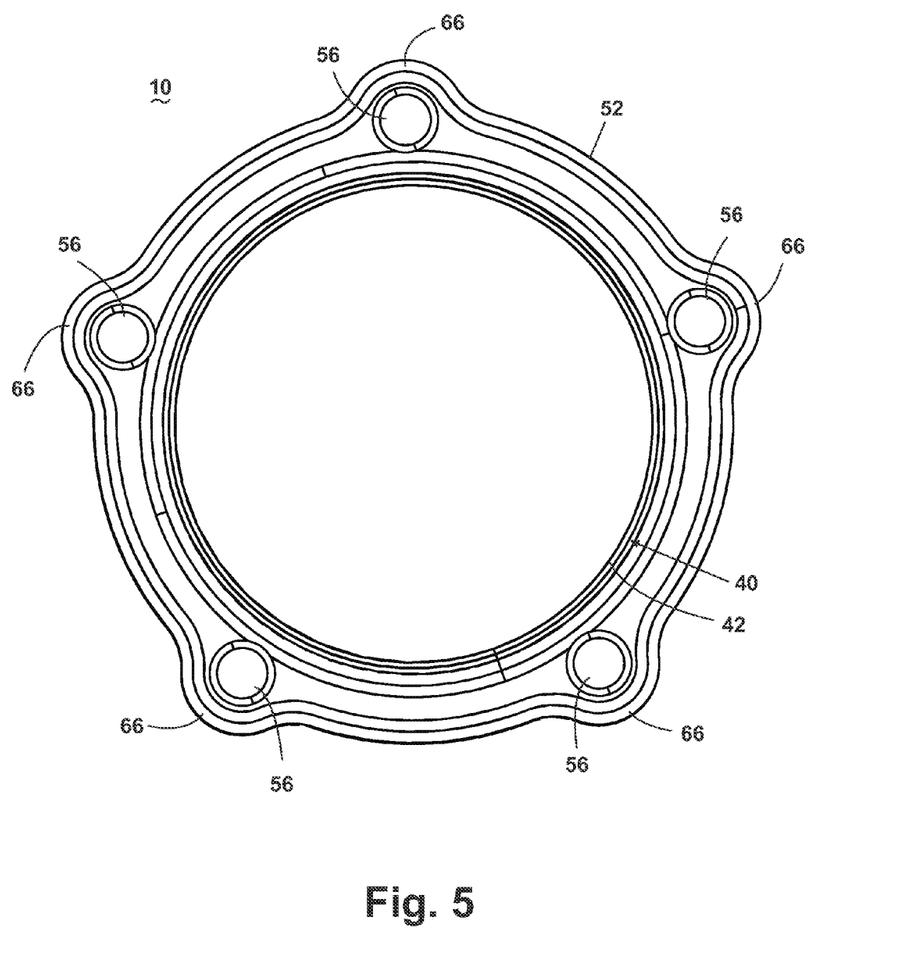
FIG. 5 is an end view of the pipe compression joint of FIG. 1.
Figure 6:
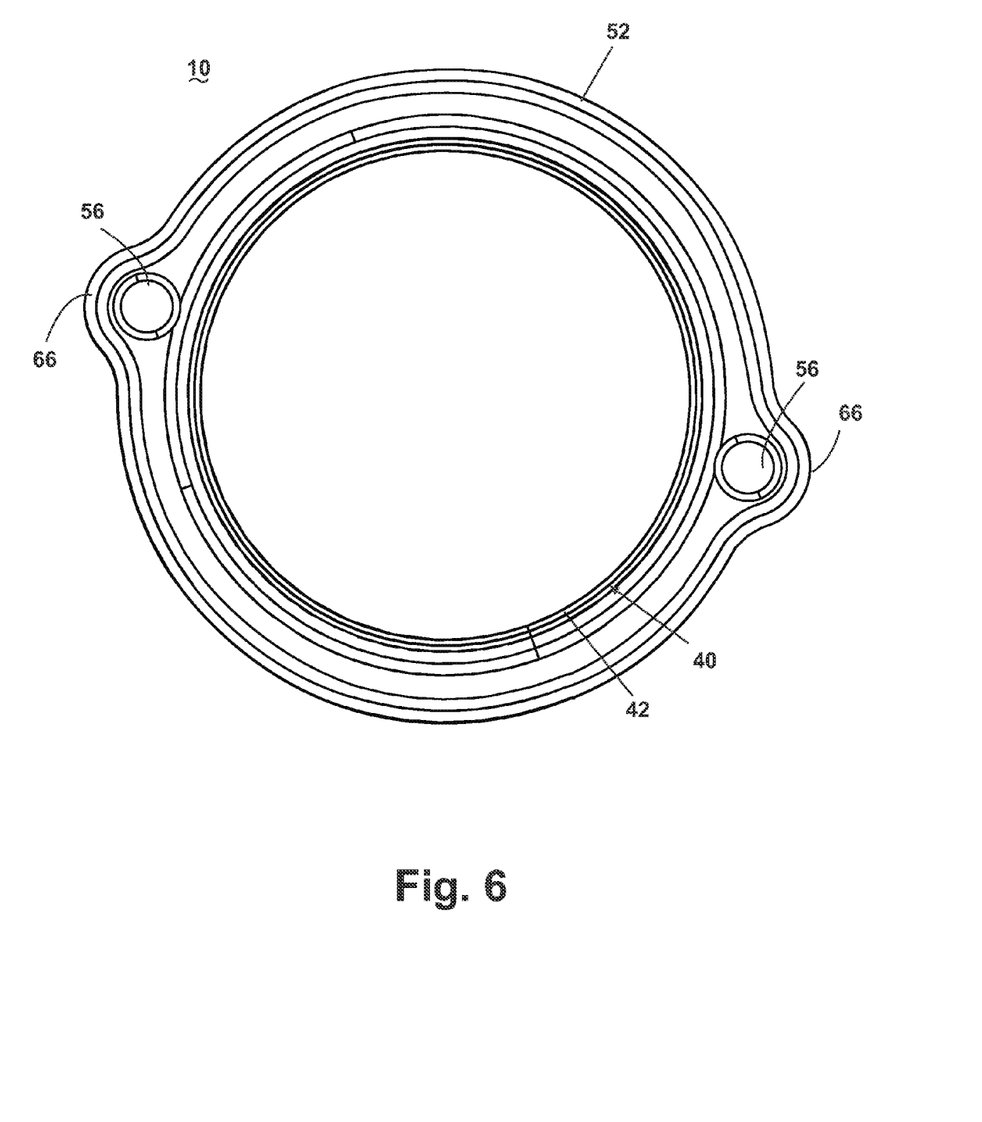
FIG. 6 is an end view of a second embodiment according to the invention of a pipe compression joint.

Referring to FIG. 6, a second embodiment of the invention comprising a compression joint assembly 10 is illustrated. The compression joint assembly 10 is substantially identical to the compression joint assembly 10 shown in FIGS. 1-5, except that two fasteners 56 are provided to connect the first and second clamp rings 54, 52 (only the second clamp ring 52 is visible in FIG. 6), which are formed with two ears 64, 66 having apertures 68, 70. The fasteners 56 can comprise bolts as discussed above.

Figure 7:
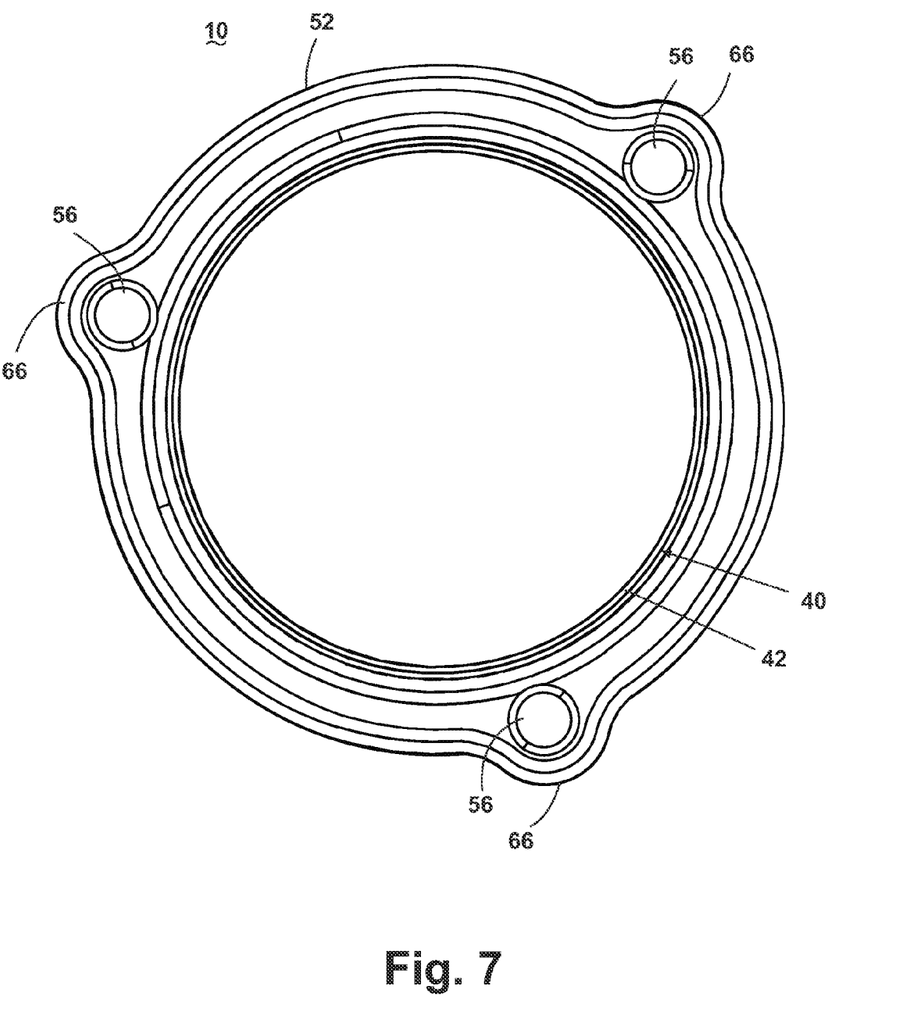
FIG. 7 is an end view of a third embodiment according to the invention of a pipe compression joint.

Referring to FIG. 7, a third embodiment of the invention comprising a compression joint assembly 10 is illustrated. The compression joint assembly 10 is substantially identical to the compression joint assembly 10 shown in FIGS. 1-5, except that three fasteners 56 are provided to connect the first and second clamp rings 54, 52 (only the second clamp ring 52 is visible in FIG. 7), which are formed with three ears 64, 66 having apertures 68, 70. The fasteners 56 can comprise bolts as discussed above.

Figure 8:
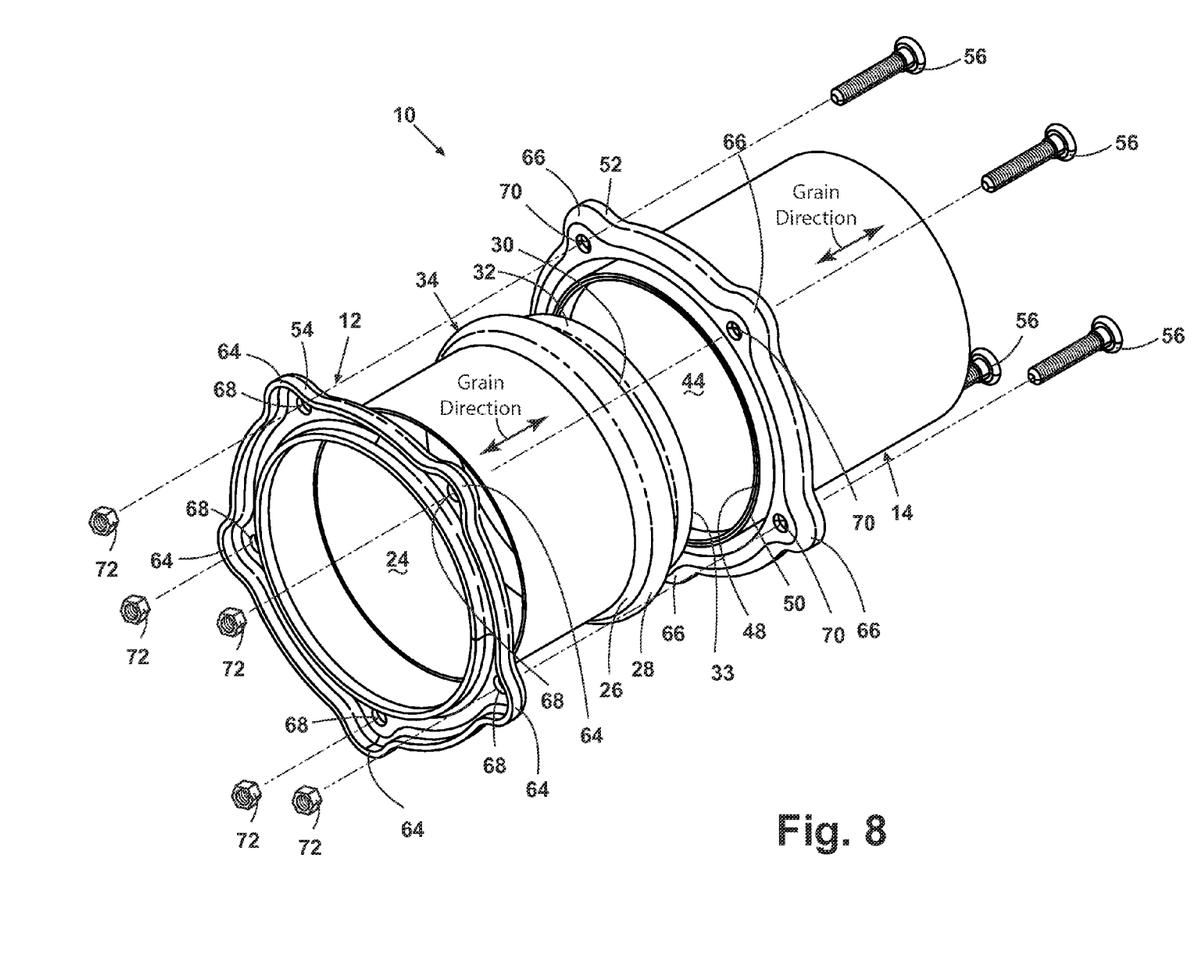
FIG. 8 is an exploded view of a fourth embodiment according to the invention of a pipe compression joint.

Referring to FIG. 8, a fourth embodiment of the invention comprising a compression joint assembly 10 is illustrated. The compression joint assembly 10 is substantially identical to the compression joint assembly 10 shown in FIGS. 1-5, except that the fasteners 56 are provided with a plurality of nuts 72 that are threaded onto the fasteners 56 to connect the first and second clamp rings 54, 52. In this embodiment, neither aperture 68, 70 are threaded. During assembly of the compression joint the fasteners 56 can be slidably inserted through the apertures 70, 68 and the nuts 72 can be threaded onto the fasters 56 adjacent either clamp ring 54, 52; as illustrated herein, the nuts 72 are threaded onto the fasteners adjacent the first clamp ring 54.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. An assembly for forming a pipe compression joint comprising:
   a male pipe end having a male pipe wall that defines a male channelway with an upstream diameter, wherein the male pipe wall includes an outwardly-extending annular rib with an outward transition portion having a constant radius of curvature from the upstream diameter to a chine portion, and an inward transition portion having a non-constant radius of curvature that decreases from the chine portion to a straight portion with a downstream diameter less than the upstream diameter, and wherein the inward transition portion has an outside surface capable of deformation;
   a female pipe end having a female pipe wall that defines a female channelway with a constant diameter greater than the downstream diameter of the straight portion of the male pipe end and that terminates at a flared portion capable of deformation and having an inside surface that defines an opening adapted for slidably receiving the straight portion;
   a first clamp ring having an opening for slidable receipt of the male pipe wall and having a radially-curved shoulder with a constant radius of curvature that is complementary to the constant radius of curvature of the outward transition portion to enable a longitudinal force applied to the first clamp ring to be transferred to the outwardly-extending annular rib of the male pipe end when the first clamp ring slidably engages the outward transition portion while enabling the first clamp ring to be rotated relative to the male pipe end; and
   a second clamp ring fixedly attached to the female pipe wall at the constant diameter portion a distance from the flared portion such that the second clamp ring is spaced from the flared portion by at least part of the constant diameter portion and does not move relative to the female pipe end so that a longitudinal force applied to the second clamp ring will be transferred to the female pipe end;
   wherein when the male pipe wall straight portion is received in the female pipe wall opening and the first clamp ring is controllably urged toward the second clamp ring, the inside surface of the flared portion of the female pipe end will engage the outside surface of the inward transition portion in surface-to-surface contact, which will increase as at least one of the inward transition portion and the flared portion is deformed to facilitate continuity of the surface-to-surface contact and effecting a gasketless sealed joint.

2. The assembly according to claim 1 wherein the first and second clamp rings can be connected to each other with a plurality of fasteners that apply force to the male and female pipe ends in a longitudinal direction.

3. The assembly according to claim 2 wherein the fasteners comprise at least two bolts.

4. The assembly according to claim 2 wherein the fasteners comprise at least three bolts.

5. The assembly according to claim 2 wherein the fasteners comprise five bolts.

6. The assembly according to claim 1 wherein the first and second clamp rings each comprise a plurality of apertures for receiving the fasteners and the fasteners are bolts.

7. The assembly according to claim 6 wherein the apertures are formed in ears which extend radially-outwardly from the circumference of the first and second clamp rings.

8. The assembly according to claim 1 wherein the flared portion urged against the annular rib after the male pipe end has been received into the female pipe end.

9. The assembly according to claim 8 wherein surface-to-surface contact between the flared portion and the annular rib extends 3-5 mm.

10. The assembly according to claim 1 wherein the second clamp ring is secured proximate to the female pipe end 7-10 mm from the opening.

11. The assembly according to claim 1 wherein the male and female pipe ends are metal and have a longitudinal grain direction that will maintain the gasketless seal through repeated thermal expansion and contraction.

12. A pipe compression joint comprising:
   a male pipe end having a male pipe wall that defines a male channelway with an upstream diameter, wherein the male pipe wall includes an outwardly-extending annular rib with an outward transition portion having a constant radius of curvature from the upstream diameter to a chine portion, and an inward transition portion having a non-constant radius of curvature that decreases from the chine portion to a straight portion with a downstream diameter less than the upstream diameter, and wherein the inward transition portion has an outside surface capable of deformation;
   a female pipe end having a female pipe wall that defines a female channelway with a constant diameter greater than the downstream diameter of the straight portion of the male pipe end and that terminates at a flared portion capable of deformation and having an inside surface that defines an opening adapted for slidably receiving the straight portion;

a first clamp ring slidably received on the male pipe wall and having a radially-curved shoulder with a constant radius of curvature that is complementary to the constant radius of curvature of the outward transition portion and bearing against the outward transition portion;

a second clamp ring fixedly attached to the female pipe wall at the constant diameter portion a distance from the flared portion such that the second clamp ring is spaced from the flared portion by at least part of the constant diameter portion and does not move relative to the female pipe end; and at least two adjustable fasteners connecting the first clamp ring to the second clamp ring;

wherein the male pipe wall straight portion is received in the female pipe wall opening and the first clamp ring is tightened toward the second clamp ring, with the inside surface of the flared portion of the female pipe end engaging the outside surface of the inward transition portion in surface-to-surface contact, and with at least one of the inward transition portion and the flared portion deformed to facilitate continuity of the surface-to-surface contact and effecting a gasketless sealed joint.

13. The pipe compression joint according to claim 12 wherein the fasteners are configured to apply force to the male and female pipe ends in a longitudinal direction.

14. The pipe compression joint according to claim 12 wherein the first and second clamp rings each comprise a plurality of apertures for receiving the fasteners and the fasteners are bolts.

15. The pipe compression joint according to claim 14 wherein the apertures are formed in ears which extend radially-outwardly from the circumference of the first and second clamp rings.

16. The pipe compression joint according to claim 12 wherein the fasteners comprise at least two bolts.

17. The pipe compression joint according to claim 12 wherein the fasteners comprise at least three bolts.

18. The pipe compression joint according to claim 12 wherein the fasteners comprise five bolts.

19. The pipe compression joint according to claim 12 wherein the flared portion is urged against the annular rib.

20. The pipe compression joint according to claim 19 wherein surface-to-surface contact between the flared portion and the annular rib extends 3-5 mm.

21. The pipe compression joint according to claim 12 wherein the second clamp ring is secured proximate to the female pipe end 7-10 mm from an opening defined by the female pipe end.

22. The pipe compression joint according to claim 12 wherein the first clamp ring has a radially-curved inner shoulder that complements the shape of the annular rib to enable a longitudinal force applied to the first clamp ring to be transferred to the male pipe end while enabling the first clamp ring to be rotated relative to the male pipe end.

23. The pipe compression joint according to claim 12 wherein the male and female pipe ends are metal and have a longitudinal grain direction that will maintain the gasketless seal through repeated thermal expansion and contraction.

24. The pipe compression joint according to claim 12 wherein the male and female pipe ends have a grain direction that is parallel to a longitudinal axis of the male and female pipe ends.

* * * * *